3,311,461
PROCESS FOR PRODUCING RARE EARTH-CONTAINING GLASS POLISHING AGENTS
Walter L. Silvernail, West Chicago, Ill., assignor to American Potash & Chemical Corporation, Los Angeles, Calif., a corporation of Delaware
No Drawing. Filed June 15, 1964, Ser. No. 375,317
4 Claims. (Cl. 51—293)

This invention relates to the production of rare earth-containing glass polishing agents. More particularly, the present invention relates to the production of glass polishing agents directly from rare earth fluocarbonate ores.

Rare earth-containing glass polishing agents are well known. Generally, these agents comprise rare earth oxides. These agents may be prepared by extracting rare earth values from rare earth-bearing ores and converting these extracted values, by a lengthy series of chemical reactions, into the desired rare earth oxide polishing agents.

Heretofore, it was generally believed that rare earth-containing glass polishing agents had to be prepared by the above method in order to achieve an acceptable polishing agent.

The present invention provides a process which results in the production of a highly satisfactory rare earth-containing glass polishing agent directly from an ore concentrate. In accordance with the present invention, long, complicated, prior art extraction and recovery procedures are avoided.

It will be understood that the term "rare earth" as used herein includes: those elements of the lanthanide series, having atomic numbers from 57 through 71 inclusive, and the elements yttrium and scandium which may be present in minor amounts in rare earth fluocarbonate ores.

Broadly, the present invention provides a process for the production of rare earth-containing glass polishing agents by subjecting a rare earth fluocarbonate or concentrate to roasting and pulverization. The concentrate may be first pulverized and then roasted or alternatively, it may be roasted and then pulverized. The preferred procedure is to pulverize and then roast the concentrate.

The rare earth fluocarbonate concentrates to which the present process is applicable include, for example, concentrates produced from low grade run-of-the-mine ores by flotation, acid leaching, sedimentation, classification and other conventional beneficiation processes. Representative examples of ores and concentrates include those having the following approximate weight percentage compositions:

| | Run-of-Mine | Conc. No. 1 | Conc. No. 2 | Conc. No. 3 |
| --- | --- | --- | --- | --- |
| Rare Earth Oxide | 4–11 | 55 | 55 | 70 |
| Fluorine | 0.4–1.3 | 5 | 5 | 7 |
| Calcium Carbonate | 40–75 | 15 | <1 | <1 |
| Barium Sulfate | 15–50 | 5 | 20 | 4 |
| Iron Oxide | (¹) | 1 | 1 | 1 |
| Aluminum Oxide | (¹) | 1 | 1 | 1 |
| Silica | (¹) | 2 | 2 | 3 |

¹ Present.

Generally, rare earth fluocarbonate ores have the following approximate weight percentage compositions:

| | Percent |
| --- | --- |
| Fluorine | 0.1–9 |
| Rare earths | 3–80 |
| Alkaline earth metal carbonates | 1–75 |
| Silica | 0.1–25 |
| Barium sulfate | 4–50 |
| Iron oxide | 1–5 |
| Aluminum oxide | 1–5 |

Rare earth fluocarbonate ores of this composition may be found in association with a wide variety of other minerals and valueless gangue materials, small amounts of which may be carried with the fluocarbonate ore concentrates into the present process. Such extraneous materials are not generally detrimental to the present process. Bastnasite is the most common rare earth fluocarbonate ore.

Rare earth fluocarbonate concentrates which are useful in this process generally contain from about 15 to 99 weight percent rare earth oxide, and, preferably, from about 45 to 90 weight percent rare earth oxide.

Typical analytical procedures for the determination of rare earths may be found in "Treatise on Analytical Chemistry," Kolthoff & Elving, part II, volume 8.

Roasting of the rare earth fluocarbonate ore may be accomplished either continuously or batch-wise in commercially available equipment such as, for example, rotary kilns, furnaces, fluidized bed apparatus, and the like.

Roasting is preferably carried out while the concentrate is maintained at a temperature between 800° F. and 2000° F., preferably between about 1200° F. and 1800° F. At about 800° F. the reaction generally proceeds rather slowly and the product may not be completely satisfactory as a glass polishing agent, while at around 2000° F., care usually must be taken to avoid producing a solid sintered mass.

The optimum temperature for roasting any given concentrate is dependent upon such variables as, for example, the composition of the concentrate, the particle size of the concentrate, the treatment of the concentrate prior to coasting, and the like.

At least a part of the carbon dioxide in rare earth fluocarbonate concentrates is removed during the roasting treatment.

The time required to complete the roasting reaction at a given temperature is largely dependent upon the geometry of the roasting system. Generally, satisfactory results may be obtained by roasting the concentrate for a period of time ranging from about 30 minutes to about 4 hours, preferably from about 1 to 2 hours.

The average particle size of the concentrate should be reduced to a range of from about 0.1 to 20 microns, preferably from about 0.5 to 5 microns. This fine grinding may be accomplished according to well known conventional procedures using, for example, ball-mills, fluid energy mills, vibro-energy mills and the like, none of which forms a part of this invention.

In the specification, claims and following specific example, all parts and percentages are by weight unless otherwise indicated. The following example is set forth to further illustrate, not to limit, the invention.

*Example*

This example is illustrative of the preparation of various glass polishing compositions directly from bastnasite.

Samples of bastnasite ore designated as 58% rare earth oxide concentrate and 70% rare earth oxide concentrate were obtained from a commercial supplier. These concentrates had the following actual analyses:

| | 58% | 70% |
| --- | --- | --- |
| Rare Earth Oxide | 60.0 | 70.8 |
| Fluorine | 4.7 | 5.3 |
| CaO | 12.9 | 4.3 |
| BaSO₄ | 6.0 | 7.4 |
| Al₂O₃+Fe₂O₃ | 1.5 | 2.4 |

These bastnasite concentrates were used as feed material for this example and are designated hereinafter as 58F and 70F, respectively. A portion of each of these concentrates was milled and these milled concentrates are designated hereinafter as 58M and 70M, respectively.

In each of the ignition studies indicated in Tables II and III, 100 gram samples of bastnasite concentrate were placed in 250 ml. nickel crucibles and ignited at predetermined temperatures in a furnace. These samples were placed in a pre-heated furnace and allowed to remain at the selected temperatures for two hours. They were then removed, allowed to cool, and passed through a 20 mesh screen to disperse any lightly bound agglomerates. The results of these studies are presented in Tables II and III ande are contrasted with the characteristics of the unignited samples shown in Table I.

In Tables I, II, and III, the abbreviated column headings have the following meanings: Temp. indicates the temperature of the preheated furnace; LOI indicates the percent weight loss on ignition; $D_T$ is the tapped bulk density in g./cm.$^3$; $d_f$ is the average particle size expressed in microns as measured by the Fisher Sub-Sieve Sizer; S is a figure of merit, indicative of polishing efficiency. Polishing efficiency, S, is expressed as the corrected average weight loss, in milligrams per minute, when a 54 mm. plano glass lens is polished on a 4 inch diameter felt polishing lap, revolving at 450 r.p.m., in a standard bowl feed polisher, with the lens held against the lap at a pressure of 0.2 kg./cm.$^2$. The composition of the polishing slurry is maintained at a standard concentration of 5.0 parts solids per 100 parts water. The corrected polishing values vary from the actual values in that allowance is made for variations resulting from the position of the lens blank on the lap and the conditioning of the lap. The correction is applied by comparing the actual removal rate to the removal rate obtained when a sample designated as a standard is used under the same conditions.

Commercially acceptable polishing efficiencies, S, range as low as about 2. Preferably, the polishing efficiency of a glass polishing slurry is at least about 2.4 and most commercial rare earth glass polishing slurries have a polishing efficiency of at least about 3.6.

TABLE I.—CHARACTERISTICS OF UNIGNITED BASTNASITE SAMPLE

| Sample | $D_T$ | $d_f, \mu$ | S |
| --- | --- | --- | --- |
| 58F | 2.37 | 10.2 | 0.32 |
| 70F | 2.78 | 12.5 | 0.75 |
| 58M | 1.91 | 4.0 | 1.10 |
| 70M | 1.48 | 1.3 | 2.13 |

TABLE II.—CHARACTERISTICS OF IGNITED 70M BASTNASITE SAMPLES

| Temp. °F. | LOI | $D_T$ | $d_f, \mu$ | S |
| --- | --- | --- | --- | --- |
| 1,200 | 14.8 | 1.36 | 0.68 | 3.93 |
| 1,400 | 14.5 | 1.29 | 0.65 | 3.90 |
| 1,500 | 15.2 | 1.41 | 0.99 | 3.78 |
| 1,600 | 15.8 | 1.28 | 1.05 | 4.13 |
| 1,700 | 15.9 | 1.45 | 1.28 | 4.10 |
| 1,800 | 15.7 | 1.46 | 2.25 | (¹) |

¹ Sintered.

TABLE III.—CHARACTERISTICS OF IGNITED 58M BASTNASITE SAMPLES

| Temp. °F. | LOI | $D_T$ | $d_f, \mu$ | S |
| --- | --- | --- | --- | --- |
| 1,200 | 16.0 | 1.87 | 1.35 | 2.68 |
| 1,400 | 18.0 | 1.82 | 2.15 | 2.56 |
| 1,500 | 19.7 | 1.84 | 3.25 | 2.76 |
| 1,600 | 20.3 | 1.72 | 3.60 | 2.72 |
| 1,700 | 20.3 | 1.77 | 4.10 | (¹) |
| 1,800 | 20.4 | 1.85 | 5.95 | (²) |

¹ Partially sintered.
² Sintered.

As will be understood by those skilled in the art, what has been described is the preferred embodiment of the invention; however, many modifications, changes and substitutions can be made therein without departing from the scope and the spirit of the following claims.

What is claimed is:

1. A process for producing a rare earth-containing glass polishing agent which consists essentially of pulverizing a bastnasite concentrate containing from about 15 to 99 weight percent rare earth oxide to a particle size of 0.1 to 20 microns, introducing only the pulverized concentrate into a heating zone and igniting only the concentrate at a temperature of from about 800 to 2,000° F. for a period of time sufficient to produce a rare earth-containing glass polishing agent and recovering the polishing agent so produced.

2. A process as set forth in claim 1 wherein the bastnasite concentrate contains from about 45 to 90 weight percent rare earth oxide.

3. A process as set forth in claim 1 in which said concentrate is pulverized to a particle size of from about 0.5 to 5 microns.

4. A process as set forth in claim 1 wherein said concentrate is ignited at a temperature of from about 1200° to 1800° F. for a period of time within the range of from about 30 minutes to 4 hours.

References Cited by the Examiner

UNITED STATES PATENTS 3,131,039  4/1964  Nonamaker _____ 51—293

ALEXANDER H. BRODMERKEL, *Primary Examiner.*

MORRIS LIEBMAN, *Examiner.*

D. J. ARNOLD, *Assistant Examiner.*